US012595895B2

(12) United States Patent
Frankiewicz et al.

(10) Patent No.: US 12,595,895 B2
(45) Date of Patent: Apr. 7, 2026

(54) MULTI-REGION OPTICS FOR FLAT ILLUMINATION

(71) Applicant: ABL IP Holding LLC, Atlanta, GA (US)

(72) Inventors: Gregory P. Frankiewicz, Elmhurst, IL (US); Jonathan Ferry, Chicago, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 18/606,680

(22) Filed: Mar. 15, 2024

(65) Prior Publication Data

US 2024/0310025 A1 Sep. 19, 2024

Related U.S. Application Data

(60) Provisional application No. 63/453,024, filed on Mar. 17, 2023.

(51) Int. Cl.

*F21V 5/04* (2006.01)
*F21S 8/02* (2006.01)
*F21Y 115/10* (2016.01)

(52) U.S. Cl.

CPC .............. *F21V 5/045* (2013.01); *F21S 8/026* (2013.01); *F21Y 2115/10* (2016.08)

(58) Field of Classification Search

CPC ................................ F21V 5/045; F21S 8/026
See application file for complete search history.

(56) References Cited

U.S. PATENT DOCUMENTS 10,323,824 B1 6/2019 Lim et al.
2016/0018085 A1* 1/2016 Van Thiel ............... F21V 5/045 362/268
2018/0231209 A1 8/2018 Schwalenberg
2019/0145603 A1 5/2019 Shih et al.
2019/0331314 A1 10/2019 Engelen
2021/0404611 A1* 12/2021 Van Der Sijde ... G02B 19/0066
2022/0268421 A1* 8/2022 Chen ...................... H04N 23/57
2022/0333760 A1* 10/2022 Marquardt .............. F21V 5/045
2023/0100351 A1* 3/2023 Mizukami ................ F21V 5/04 362/297
2023/0151944 A1 5/2023 Castillo et al.

(Continued)

FOREIGN PATENT DOCUMENTS

EP 4098933 A1 12/2022

OTHER PUBLICATIONS

U.S. Appl. No. 18/820,898 , Non-Final Office Action, Mailed on Feb. 10, 2025, 13 pages.

(Continued)

*Primary Examiner* — Christopher E Dunay
(74) *Attorney, Agent, or Firm* — Kilpatrick Townsend & Stockton LLP

(57) ABSTRACT

A multi-region lighting system for flat illumination includes one or more light sources and an optic. The optic comprises a first region characterized by a first refractive-index feature and a second region characterized by a second refractive-index feature. The second region comprises a ridge structure. The first and second refractive-index features and the ridge structure are operative to produce a composite light distribution from the one or more light sources.

20 Claims, 7 Drawing Sheets

(56) References Cited

U.S. PATENT DOCUMENTS

| | | | | |
|---|---|---|---|---|
| 2024/0240783 | A1* | 7/2024 | Vilem | G02B 3/08 |
| 2024/0255123 | A1* | 8/2024 | Delalande | F21V 7/041 |

OTHER PUBLICATIONS https://www.acuitybrands.com/products/detail/88156/lithonia-lighting/6-lens-glass-fresnel/6-residential-recessed-downlighting.
https://upmold.com/surface-finish-ra-rz/.
U.S. Appl. No. 18/820,898 , Notice of Allowance, Mailed on May 23, 2025, 8 pages.
Application No. CA3,231,975, Office Action, Mailed On Oct. 28, 2025, 3 pages.

* cited by examiner

MULTI-REGION OPTICS FOR FLAT ILLUMINATION

CROSS-REFERENCES TO RELATED APPLICATIONS

This application claims the benefit of U.S. Provisional Patent Application No. 63/453,024, filed on Mar. 17, 2023, the disclosure of which is hereby incorporated by reference in its entirety for all purposes.

BACKGROUND

A light fixture is an electronic device used to emit light and is sometimes referred to as a light fitting or luminaire. A light fixture can provide illumination inside a building, such as in a room of a house or business, or outside, such as to illuminate a tree or sidewalk. A light fixture can be battery powered, plugged into an electrical socket, or hardwired to an electrical source, such as a recessed can or a ceiling light hard wired in connection with a main electrical service panel of a building.

A light fixture comprises a lamp, sometimes referred to as a bulb, configured to generate light. The lamp can comprise one or more light sources, such as multiple light-emitting diodes (LEDs) to generate light from an applied electrical current.

The light fixture can have features, such as a reflector for directing light, a housing, an aperture, and/or a lens. The housing can be used for aligning the lamp and/or for protecting the lamp. Special-purpose light fixtures are used for a wide variety of purposes from automobile lighting to medical lighting.

SUMMARY

In certain configurations, a system for a light fixture comprises one or more light sources and an optic. The optic comprises a first region comprising a first refractive-index feature; a second region comprising a second refractive-index feature and a ridge structure in the second region. The first refractive-index feature, the second refractive-index feature, and the ridge structure are arranged to produce a composite light distribution from the one or more light sources. In some embodiments, the first refractive-index feature is a first texture; the second refractive-index feature is a second texture; the first texture is rougher than the second texture; the optic comprises a first side and a second side opposite the first side; the first side faces the one or more light sources; the first refractive-index feature is a first texture of a surface of the second side of the optic; the second refractive-index feature is a second texture of the surface of the second side of the optic; the ridge structure is on the first side of the optic; the first texture is rougher than the second texture; the second refractive-index feature is formed by roughness on a surface of the optic; there is no ridge structure in the first region; the ridge structure is arranged to focus light, from the one or more light sources, within the second region; the first refractive-index feature is arranged to disperse light from the one or more light sources; the ridge structure is a first Fresnel structure; the second region is arranged to be replaceable by a second Fresnel structure having a different focal length than the first Fresnel structure; the first region has an elliptical shape; the second region has an elliptical shape; the second region is inside the first region; the first region is concentric with the second region; and/or the system comprises a trim having a height equal to or less than 3 inches.

In certain configurations, a method comprises generating light from one or more light sources; transmitting a first portion of light from the one or more light sources through a first region of an optic, wherein the first region is characterized by a first refractive-index feature; and/or transmitting a second portion of light from the one or more light sources through a second region of the optic, wherein the second region is characterized by a second refractive-index feature and a ridge structure in the second region, and the first refractive-index feature, the second refractive-index feature, and the ridge structure are operative to produce a composite light distribution from the one or more light sources. In some embodiments, the ridge structure is a Fresnel lens.

In certain configurations, a system comprises one or more light sources and an optic. The optic comprises a first region comprising a first feature and a second region comprising a second feature arranged to focus light. The first feature and the second feature are arranged to produce a composite light distribution from the one or more light sources. In some embodiments the system comprises a trim having a height equal to or less than 3 inches tall; the second feature is a Fresnel lens; the second feature is a lens; the second feature is a freeform lens; the first feature is a first texture; the second region comprises a second texture; and/or the second texture is finer than the first texture.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The present disclosure generally relates to lighting. More specifically, and without limitation, the present disclosure describes a multi-region optic for flat (e.g., uniform) illumination.

Uniform illumination can be a desirable lighting outcome in various applications where even light distribution is used for visual comfort, functionality, and/or aesthetic purposes. Modifying the structure of light can be achieved through various techniques and components designed to manipulate light emitted from a light source, to provide consistent and well-dispersed illumination. Optics, such as a diffuser, can be used to serve in the optical system modifying the emission of light, such as softening and/or distributing light as desired across a designated area. Diffusers can be made from translucent materials such as frosted glass, acrylic, or plastic, which allow light to pass through while scattering it in various directions. Incorporating an optic by an appropriately designed reflector and/or trim into a lighting system can enhance the overall performance and/or visual appeal of the setup. Improved illumination systems, apparatuses, and/or methods are desired.

In some embodiments, a light-fixture system comprises a light source and an optic; the optic comprises a first region characterized by a first refractive index feature and a second region characterized by a second refractive index feature; the second region comprises a ridge structure, and the first refractive index feature, the second refractive index feature, and the ridge structure are operative to produce a composite light distribution from the light source.

Figure 1:
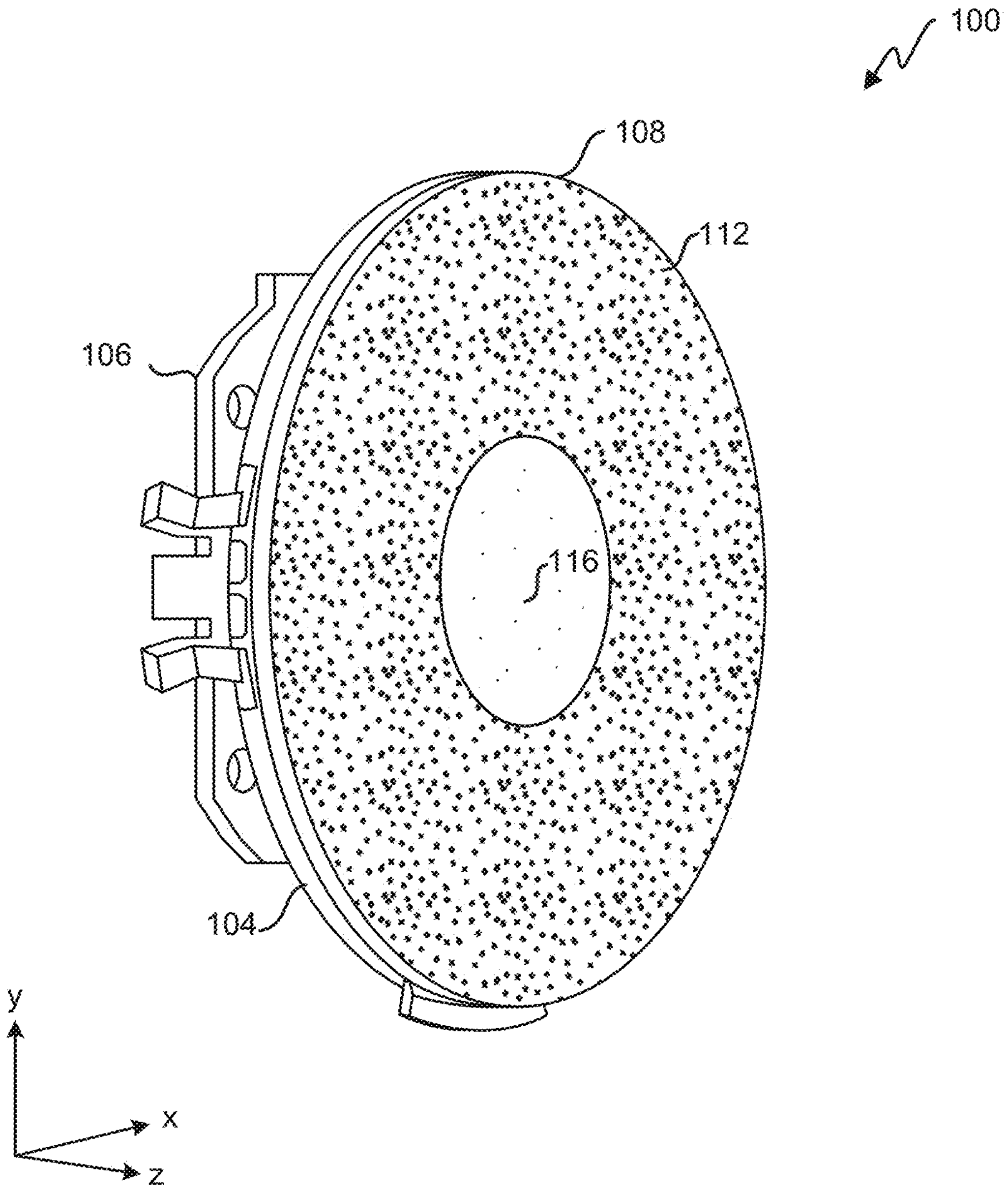
FIG. 1 illustrates an embodiment of a light fixture.

FIG. 1 illustrates an embodiment of a light fixture 100. Light fixture 100 is a multi-region light fixture. The light fixture 100 can be recessed or flush mounted (e.g., in a ceiling). The light fixture 100 comprises a reflector 104, a mount 106, an optic 108, and one or more light sources (e.g., a multi-LED lamp) within the reflector 104 between the mount 106 and the optic 108. The reflector 104 and mount 106 can be considered part of the housing. A trim (not shown in FIG. 1) can be used to recess the light fixture 100 from a surface, such as a ceiling. The trim can be used to focus light and/or otherwise shape light from the light fixture 100. The trim is the visible portion of the light fixture (e.g., with the optic 108, if viewed from a steep enough angle).

The optic 108 is a lens system comprising a first region 112 and a second region 116. The first region 112 comprises a first feature (e.g., a first optical feature for refracting, directing, and/or scattering light). The second region 116 comprises a second feature (e.g., a second optical feature for refracting, directing, and/or scattering light).

In some configurations, the second feature is a ridge structure. The ridge structure can be a set of concentric ridges. For example, the ridge structure can have a smooth (e.g., sinusoidal), triangular, sawtooth, step (e.g., rectangular grooves and ridges with binary height or multiple different rectangular heights), or other profile. The set of ridges can have the same heights (amplitude) and shapes or have varying heights, angles, and/or surfaces. For example, the profile can be a sinusoidal profile with increasing amplitude. Each ridge, or the set of ridges as a whole, can be used to focus light like a lens. For example, the set of ridges, as a whole, can be shaped to form a Fresnel lens; or each ridge can be a separate lens.

In some configurations, the second feature is a lens. The lens can be arranged to focus light from the one or more light sources. The lens can be one or more ridges from a ridge structure (e.g., a Fresnel lens), a simple lens (e.g., double convex, plano-convex, positive meniscus, etc.), a compound lens, a freeform lens, or other type of lens.

In some configurations, the second feature is a texture. In some configurations, the second region 116 comprises a ridge structure, a lens, and/or a texture. In some embodiments, the second region 116, and thus the ridge structure and/or lens, if the second region 116 comprises a ridge structure and/or lens, is removably coupled with the first region 112. For example, the second region 116 is arranged to be removably coupled with the first region 112; the second region 116 is arranged/configured to be replaced with a lens of different power for a different lighting situation).

The first feature and the second feature are arranged to produce a composite light distribution from the one or more light sources. In some arrangements, the first feature is a first texture (e.g., frosting or etching) on an outside surface of the first region 112, the second region 116 comprises a second texture on an outside surface of the second region 116, the second texture is finer (e.g., smoother, not as rough) than the first texture, and/or the second region 116 comprises a ridge structure (e.g., Fresnel lens) on an inside surface of the optic 108. In some embodiments, roughness is quantified by measuring a difference between the highest peak and the lowest valley within a sample length to obtain a maximum height of the sample profile; and the maximum height of a sample of the first texture is equal to or greater than 1.25, 1.5, 2, 3, 5, or 10 times a maximum height of a sample of the second texture and/or equal to or less than 5, 10, 100, or 1000 times the second texture.

Features can include surface texture, such as adding material to a surface of an optic, removing material from a surface of an optic (e.g., etching), and/or molding a lens to create surface variations (e.g., random, arbitrary, or non-symmetrical variations) or roughness. Features can include optical elements such as lenslets. Features can be variations within the thickness of the optic, such as optical elements or ion implantation in-between optical surfaces of the optic. Features can be on an optical surface, below an optical surface, or a combination (e.g., on a surface and extending below or into the optic).

Figure 2A:
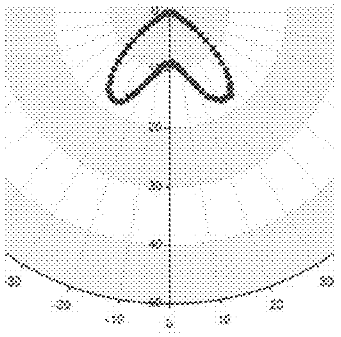
FIGS. 2A and 2B depict illumination graphs for a first region of an embodiment of an optic.
Figure 2B:
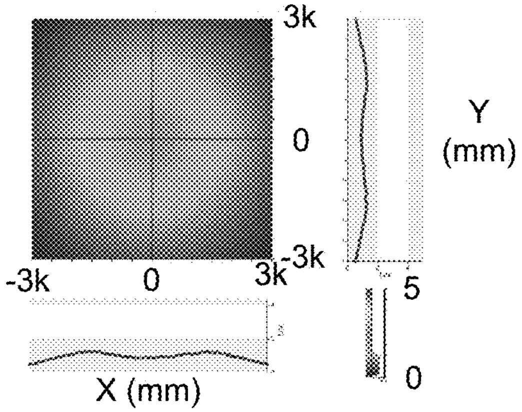

FIGS. 2A and 2B depict illumination from the first region 112 in FIG. 1 of an embodiment of the optic 108. The first region has heavy random texture and no ridge structure (e.g., Fresnel lens). The first region 112 is an outer portion of the optic. FIG. 2A is a photometric diagram and FIG. 2B shows two-dimensional light intensity distribution from the first region 112.

The first region exhibits a rough texture, which causes the incoming light from the lamp to deflect, refract, and/or deform and ultimately results in a batwing pattern, such as single rough batwing shape. The texture of the optic may be, but not limited to, surface roughness or texture (e.g., by etching the optic, sandblasting the optic, and/or depositing a material on the optic). For example, surface deformation or destruction is used to roughen and/or alter a surface to refract and/or scatter light. In some embodiments, a tool is used to scratch, bead blast, or chemical etch a surface that imprints a pattern and/or texture in a molded plastic part.

Figure 3A:
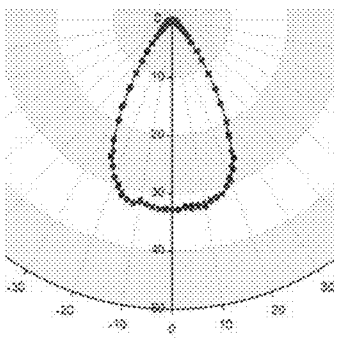
FIGS. 3A and 3B depict illumination graphs for a second region of an embodiment of the optic.
Figure 3B:
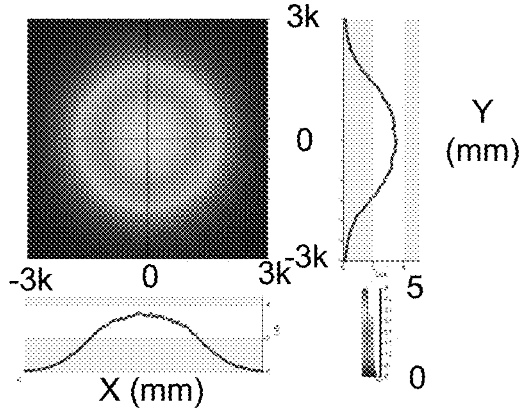

FIGS. 3A and 3B depict illumination from the second region 116 in FIG. 1 of the optic 108. The second region 116 has lighter random texture and a ridge structure (e.g., Fresnel lens). The second region 116 is an inner portion of the optic 108. FIG. 3A is a photometric diagram and FIG. 3B shows two-dimensional light intensity distribution from the second region 116.

The ridge structure in the second region 116 deflects light to fill a middle of the beam to produce a desired final batwing pattern. By altering the ridge structure, a desired final pattern can be changed without altering the texture, reflector, and/or trim. The combination of the first region, the second region, and/or the ridge structure forms the beam mostly in the optics. In a system comprising the optics and a trim, the optics can reduce the design limitation of the trim of the light fixture and/or improve the efficiency of the light illumination. Light alteration by the trim can show up as contribution as focusing light in a middle of the beam or as more of a ring of light, batwing, and/or cardioid shape. Using a ridge structure can collect more light to the center of the optic for flatter illumination. The contribution of the trim, the outer texture region, and/or the ridge structure create a final target distribution. The optic can also be used in a system without a trim.

Figure 4A:
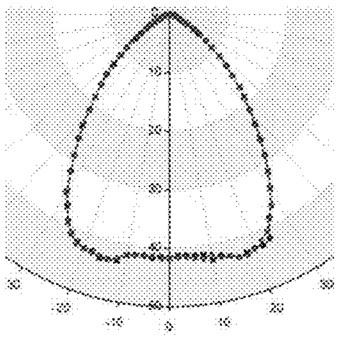
FIGS. 4A and 4B depict graphs of combined illumination from the first region and the second region of an embodiment of the optic.
Figure 4B:
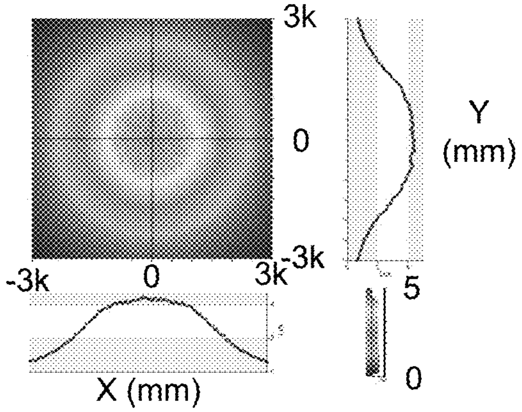

FIGS. 4A and 4B depict combined illumination from the first region 112 and the second region 116 in FIG. 1 of an embodiment of the optic 108. The optic 108 combines heavy texture in the first region 112 with light texture and a ridge structure (e.g., Fresnel lens) in the second region 116.

In some embodiments, the first region exhibits a rough texture which causes the incoming light from the light source to refract and ultimately results in multiple batwing shape dispersion of emitted light. The ridge structure in the second region refracts light and can result in a general batwing shape radiation with flat illumination. The combination of the first and second regions forms the beam mostly by the optic (e.g., and not mostly using the trim).

In some embodiments, the outer texture portion roughs in a wider shape of the beam while also appearing more uniform (e.g., to provide a smooth appearance when viewed directly) and/or to provide hiding of the lamp when viewed at high angles. By combining the outer region with a center region that has a lighter (or no) texture to provide more optical control, an illumination from the light fixture can achieve a desired pattern, such as a 1.0 Spacing Criterion (SC) batwing. By changing an optical recipe in the center portion (e.g., the second region 116 in FIG. 1), the beam can be reshaped to either narrow or batwing (such as a 0.8 SC version, or wider for a 1.2 SC version). When viewed while installed, different versions of the optic can appear identical to a person in the space illuminated by the optic while still producing different beams from the fixtures.

In some embodiments, the outer portion of lens has heavy random texture but has no ridge structure. The inner portion of lens has light random texture and ridge structure for beam control. The full lens comprises the combination of light and heavy texture and central ridge structure beam control. The heavy random texture is disposed on the output side of the lens, facing the room, the light random texture is on the inside or outside or the lens, and the ridge structure is on the inside, facing the lamp. The first region and the second region collectively produce a light output with a desired distribution. In some embodiments, more than two regions (e.g., with different textures) are used.

The optic can provide flat illumination. In some embodiments, flat illumination is no more than 10% or 20% variance for 30 or 40 degree span (e.g., from −20 degrees to 20 degrees for light arranged to direct illumination downward) in a photometric polar diagram.

Figure 5A:
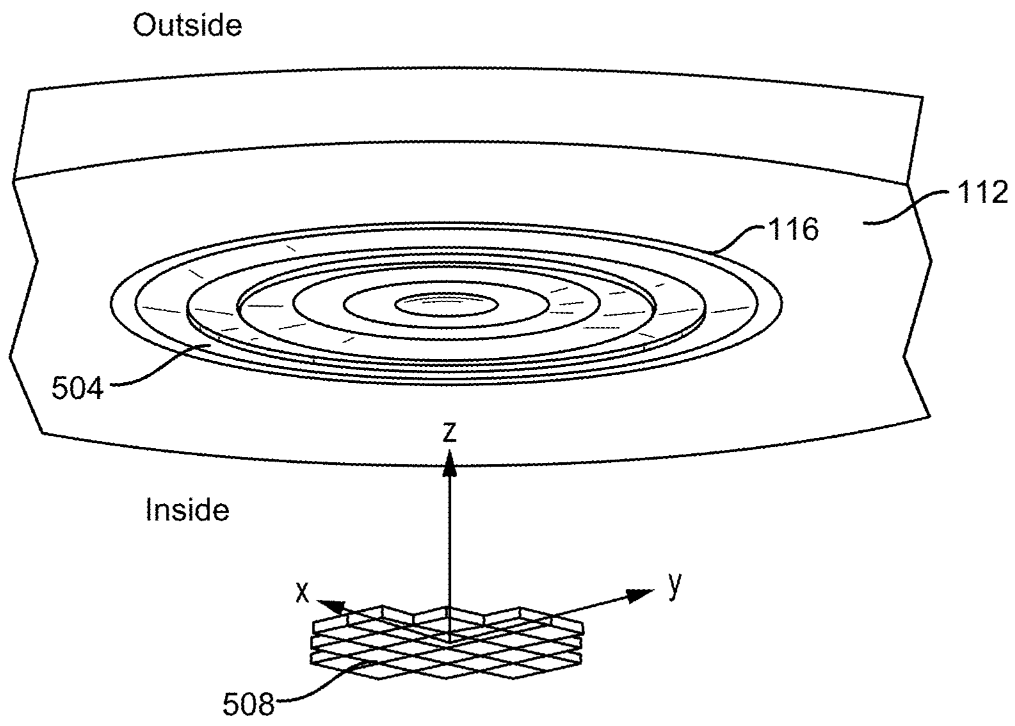
FIGS. 5A and 5B depict embodiments of Fresnel lenses in the second region of an optic.
Figure 5B:
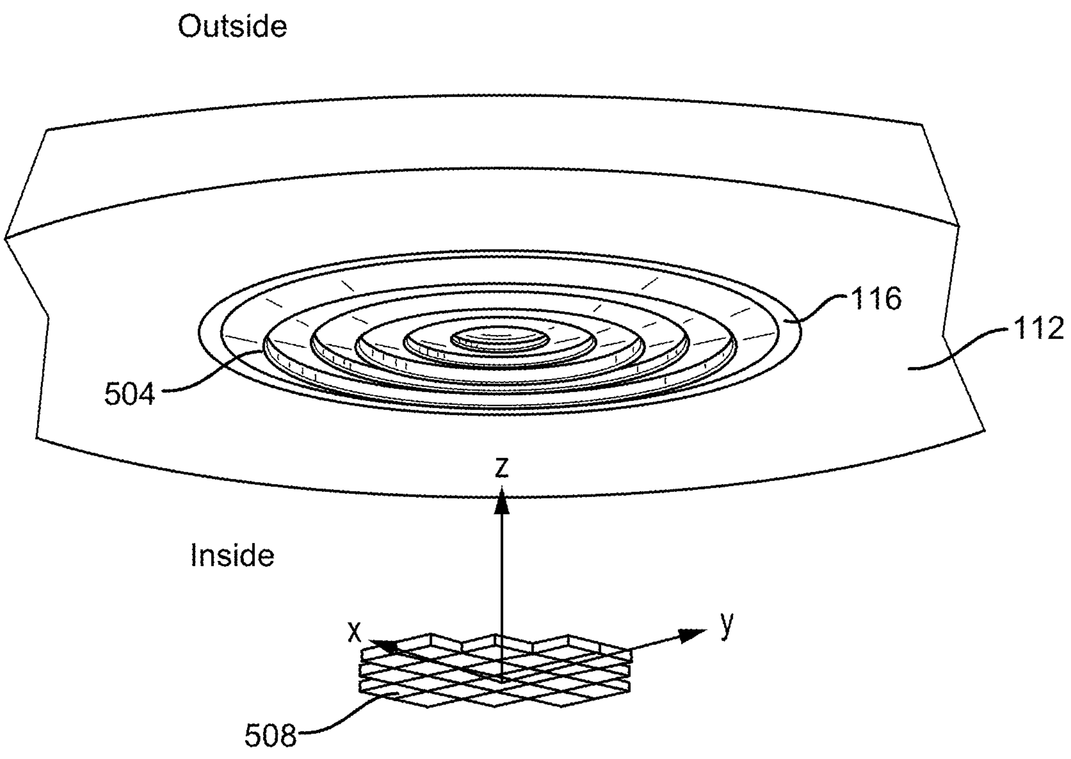

FIGS. 5A and 5B depict embodiments of Fresnel lenses 504 in the second region 116 of an optic. FIG. 5A depicts an optic with a 1.2 SC, Fresnel diameter of 1 inch, and a Fresnel maximum height (in the z dimension) of 0.3 mm. FIG. 5B depicts an optic with a 0.8 SC, Fresnel diameter of 1 inch, and a Fresnel maximum height (in the z dimension) of 0.7 mm.

A lamp, such as a multi-LED light source 508, faces the z-direction and emits light in the z-direction (e.g., with some spread in the x and y dimensions). The lamp is inside the housing of FIG. 1 (e.g., mounted to mount 106 in FIG. 1). The Fresnel lens 504 is shown on an inside surface (e.g., a surface of the optic closest to and/or facing the multi-LED light source 508) of the second region 116. An optical feature, such as texturing, lens, or lenslet, is on an outside surface (e.g., a surface opposite the inside surface and farther away from the multi-LED light source 508 than the inside surface) of the first region 112 and/or the second region 116. The optic is arranged so that light from the lamp passes through the inside surface and the outside surface (e.g., first through the inside surface and then through the outside surface). In some configurations, the Fresnel lens 504 is on the outside surface of the optic and/or has optical features in addition to a Fresnel structure (e.g., texturing). In some cases, the Fresnel lens 504 is on the inside so that texturing can be more evenly and/or easily applied to the outside surface of the optic.

A Fresnel lens 504 is a compact, lightweight lens that uses a series of concentric grooves or steps to focus light. It can be used for concentrating light or projecting images. By leveraging the concentric ring structure and stepped surface of the Fresnel lens structure, the Fresnel lens 504 can diffract light into a desired shape (e.g., more uniform and/or evenly dispersed illumination; or purposely create a distribution that is not uniform, so that it fills in missing portions of a beam that comes from a texture region and/or off the trim, so a resulting beam is a desired target distribution, batwing, or otherwise) without the bulk of a traditional lens.

Generating uniform lighting from a light source with a compact trim can be challenging. In some configurations, an optic with a Fresnel lens fully covering a surface of the optic (a full Fresnel lens) is used, with texturing. Using the full Fresnel lens and texturing on the optic can be useful in some situations. However, efficiency from a light source in a compact housing suffers at an outer edge of the Fresnel lens because of total internal reflection (TIR), causing light to TIR back towards the light source. The full Fresnel lens configuration (e.g., without texturing) may appear different when viewed directly and/or may perform poorly at hiding the light source. Thus, in some situations, the Fresnel lens 504 is only in the second region 116 and not the first region 112, and/or on an inside surface. In some embodiments, a radius of the first region is equal to or less than ½, ⅓, or ¼ of the radius of the optic and/or equal to or greater than 1/10, ⅛, ⅙, ⅕, or ¼ of the radius of the optic.

Optics with a textured surface can scatter and/or redistribute light, helping to modify intensity, direction, or distribution. Textured surfaces can be designed to produce specific patterns or levels of diffusion. However, a texture only based approach, for example with fully textured surface, can limit control for forming multiple output beams for different applications. EVO4, EVO6 and ICO4 products from Acuity Brands are example of downlights using texture only based approach to control illumination (e.g., https://www.acuitybrands.com/products/detail/1657499/gotham-lighting/evor-4-round-downlight/general-illumination-led-downlight). These products rely on the trim to provide the generally batwing shape. Increasing diffusion of the lens feeding the reflector widens the beam feeding the trim, thereby widening the batwing shape. Other cases may offer the same primary optical system, but change the trims to change desired distributions.

In some embodiments, a Fresnel height (e.g., in the z dimension) of the Fresnel lens 504 in the second region 116 may be modified to achieve a desired SC. For example, given a Fresnel diameter of 1 inch, the Fresnel height max of 0.3 mm results in a 1.2 SC, while a Fresnel height max 0.7 mm yields a 0.8 SC.

The second region 116 with the Fresnel lens 504 helps fill in the middle of the beam, while the first region 112 with heavier texture helps to make the main lobes of the beam. The size of the Fresnel lens 504 and texture may be modified to meet different design constraints in different kind of trims. The optic may be circular.

In some embodiments, the optic may be used in front of a composite light source. For example, the multi-LED light source 508 comprises 12 to 48 LEDs, or fewer or greater number of LEDs.

In some embodiments, the second region 116 may provide beam control other than with the use of the Fresnel lens 504 and/or texture, for example, using "Free-Form" features. Instead of a structure with concentric ridges conceptually performing like a full-sized lens compressed into a generally flat pattern, in a free form optic, the surface of the optic (either input and/or output) can float freely in order to form a specific desired pattern. In some embodiments, the optics known as "black-hole" optic may be used to instead of the Fresnel lens 504.

In some configurations, a system for a light fixture comprises one or more light sources and an optic. The optic comprises a first region comprising a first refractive-index feature; a second region comprising a second refractive-index feature and a ridge structure in the second region; and the first refractive-index feature, the second refractive-index feature, and the ridge structure are arranged to produce a composite light distribution from the one or more light sources. The second refractive-index feature is not the same as the first refractive-index feature (e.g., textures of different roughness, or a ridge structure and a texture). The first refractive-index feature can be a first texture; the second refractive-index feature can be a second texture; and the first texture can be rougher (e.g., to diffuse light to a greater extent) than the second texture. The optic can comprises a first side (e.g., an inside surface) and a second side (e.g., an outside surface) opposite the first side; the first side faces the one or more light sources; the first refractive-index feature is a first texture on (e.g., applied to or etched in) a surface of the second side of the optic; the second refractive-index feature is a second texture of the surface of the second side of the optic; the ridge structure is on the first side of the optic; and/or the first texture is rougher than the second texture. The ridge structure is arranged to focus light, from the one or more light sources, within the second region; and the first refractive-index feature is arranged to disperse light from the one or more light sources.

The second region can be configured to be replaced by an installer. For example, the ridge structure is a first Fresnel structure, and the second region is arranged to be replaceable by a second Fresnel structure having a different focal length and/or focusing effect than the first Fresnel structure. In this way, an installer can replace the second region to be installed for a different SC.

The first region can have an elliptical shape; the second region can have an elliptical shape; the second region is inside the first region; and the first region is concentric with the second region. For example, the first region 112 and the second region 116 are concentric circles sharing the same center, the second region 116 being inside the first region 112, and the first region 112 is an annulus shape around the second region 116 (e.g., having an inside radius equal to an outside radius of the second region 116).

Figure 6A:
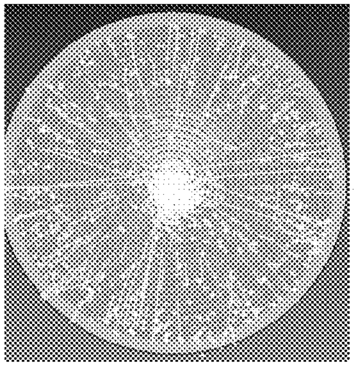
FIGS. 6A and 6B depict light diagrams of an embodiment of an optic with a full Fresnel lens and texture.
Figure 6B:
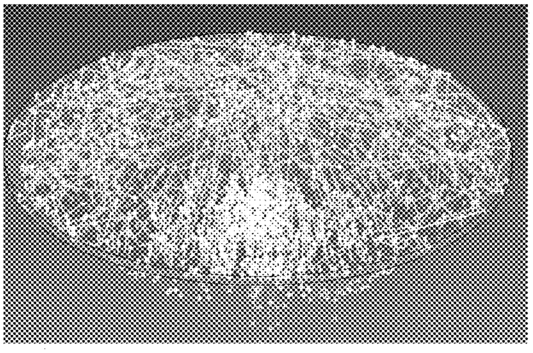

FIGS. 6A and 6B depict light diagrams of an embodiment of an optic with a full Fresnel lens and texture. FIG. 6A is a view at 10 degrees, and FIG. 6B is a view at 60 degrees.

Figure 7A:
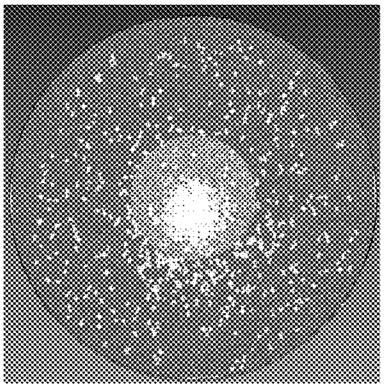
FIGS. 7A, 7B, and 7C depict light diagrams of an embodiment of an optic with multiple regions.
Figure 7B:
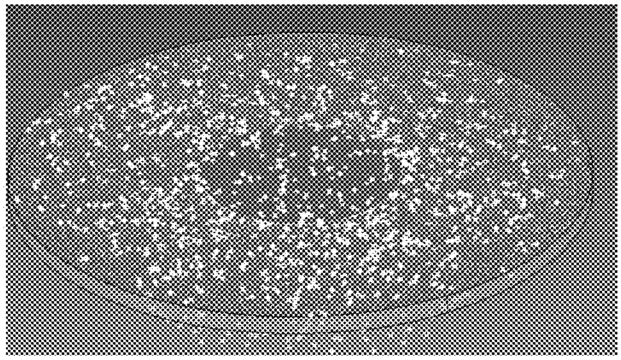
Figure 7C:
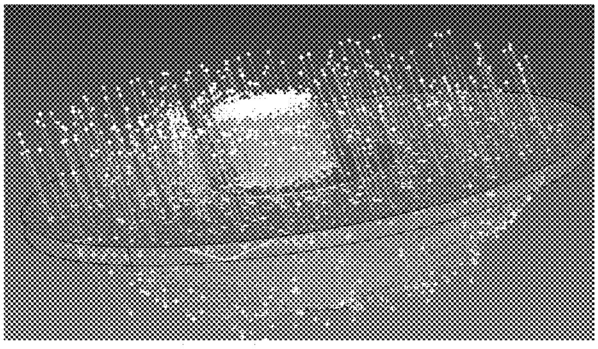

FIGS. 7A, 7B, and 7C depict light diagrams of an embodiment of an optic with multiple regions, and a center diameter of one inch. FIG. 7A is a view at 10 degrees. FIG. 7B is a view at 60 degrees. FIG. 7C is a perspective side view.

Figure 8A:
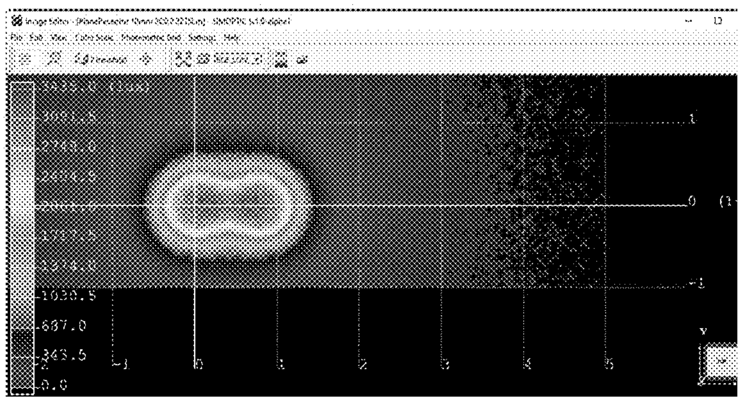
FIGS. 8A, 8B, and 8C depict illumination patterns of embodiments of light fixtures at different spacings.
Figure 8B:
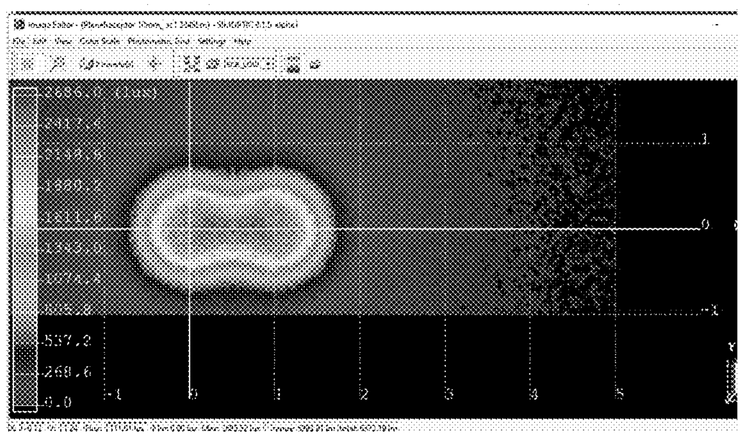
Figure 8C:
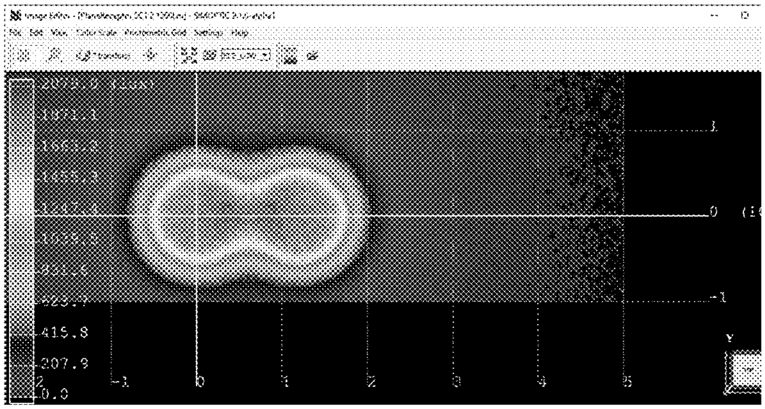

FIGS. 8A, 8B, and 8C depict illumination patterns of embodiments of light fixtures at different spacings. There is no trim in FIGS. 8A, 8B, and 8C. FIG. 8A depicts an embodiment of a 0.8 SC optic with an output of 3225 lumens. FIG. 8B depicts an embodiment of a 1.0 SC optic with an output of 3348 lumens. FIG. 8C depicts an embodiment of a 1.2 SC optic with an output of 3360 lumens. The light fixtures in FIGS. 8A, 8B, and 8C are the same with the exception of different Fresnel lenses in the second region.

Figure 9A:
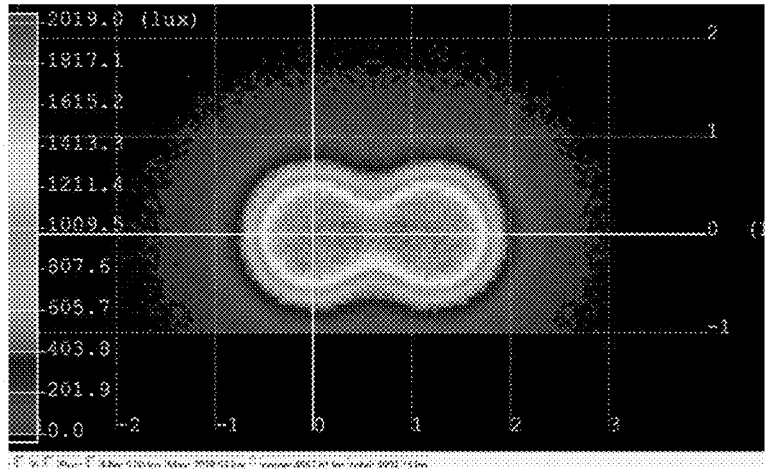
FIGS. 9A, 9B, and 9C depict illumination patterns of embodiments of light fixtures with different trim.
Figure 9B:
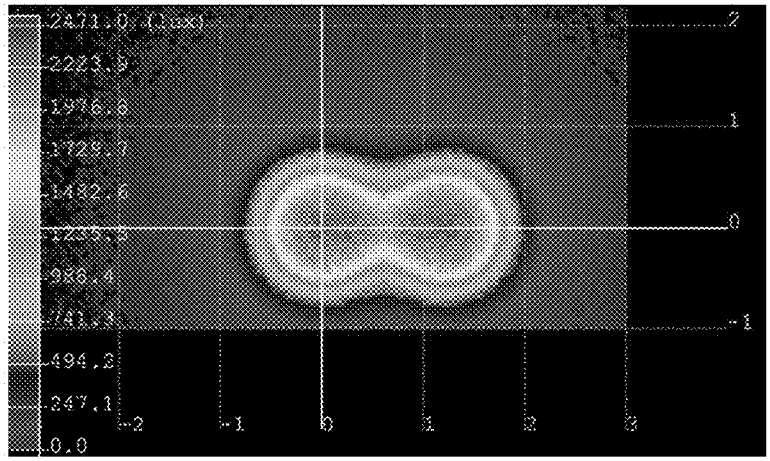
Figure 9C:
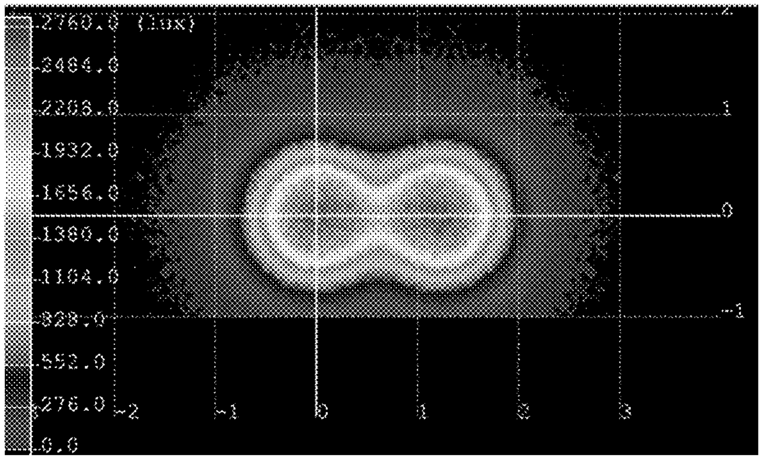

FIGS. 9A, 9B, and 9C depict illumination patterns of embodiments of light with different trim. FIG. 9A is a 1.2 SC optic, black trim, and 2500 lumen output. FIG. 9B is a 1.2 SC optic, white trim, and 3520 lumen output. FIG. 9C is a 1.2 SC optic, metalized trim, and 3130 lumen output. The light fixtures in FIGS. 9A, 9B, and 9C are the same with the exception of different trims.

Using multiple regions of an optic (e.g., texture and/or ridge shapes) can put more optical control into the optic instead of relying on the trim for illumination shaping. The addition of a trim at the output of the optic can regress an output face of the optic to provide glare control and/or cutoff, but the trim will often alter the shape of the light emanated by the optic. Shorter trims tend to focus more light in the center of the beam and taller trims tend to form batwings or make holes in the center of the beam, but that can be changed depending on trim geometry. By using a multi-region optic, the same housing and/or trim can be used and the optic changed to produce different beam patterns. For example, the Fresnel element can be changed for 0.8, 1.0, or 1.2 spacing. Thus, multiple shapes of beams can be made using the same trim. Batwing and narrow beams can be made by simply changing the optic and using the same trim. In some configurations, different Fresnel elements are used to pull different amounts of light into the center for a batwing beam or a narrow beam.

Contributions of light shaping from the trim can limit how a beam is shaped. By purposely limiting how much light hits the trim, the trim can be shaped so that instead of aiding in forming the desired beam(s), the trim shape reduces the contribution of the trim to shaping the beam. For example, the trim has a height equal to or less than 3, 2.5, or 2 inches (e.g., height measured in the z direction from the optic 108 in FIG. 1). By reducing the trim impact to beam forming, the beam can be mostly formed by the optic. In some embodiments, the Fresnel lens of the inner portion is designed to not as tightly focus the beam (e.g., because of beam forming done by the trim).

In some embodiments, a reflector may be used to hold the multi-region optic in place. The reflector can server two functions: 1) it can hold the multi-region optic in the correct z-location so that there is a repeatable z-location to design the center region to; and/or 2) it can improve an efficiency of the optical system. When the optic is spaced away from the lamp (e.g., LEDs), there is a high angle light emitted from the LEDs that misses the optic (e.g., depending on the diameter of the designed optic and the Z height). By adding in a reflector, the light that would have not been collected by the multi-region optic can be turned in a generally "forward" direction, so that it contributes to the final fixture output. In some embodiments, the lens is held so close to the LEDs that not much light misses the lens (e.g., light that misses the optic is equal to or less than 35%, 30%, 25%, 20%, 15%, 10%, or 5%) and the beam from the reflector is generally not shaped much (e.g., generally Lambertian). In some embodiments, the reflector is made taller in order to space the multi-region optic farther away from the lamp (e.g., to keep the plastic lens cooler so the lens is moved farther away from the lamp). In this case, much more light will hit the reflector surface. Thus, the reflector surface (specular vs semi-specular vs diffuse) and/or shape is taken into consideration to tailor the specific base distribution coming from the reflector so the multi-region lens can work properly and/or the center region can be used to overcome the contribution from the reflector, depending on the desired beam target. This idea is similar to working with light coming from the trim. The combination of the reflector and optic can be designed to function properly with the trim in place. Accordingly, a reflector and/or a trim are used in some embodiments, height/profile of the trim are not critical, and/or textures and/or refracting features in regions of the lens can take the performance of the reflector into account in the design. Without a reflector, the function/performance of the outer texture region can be diminished.

Figure 10:
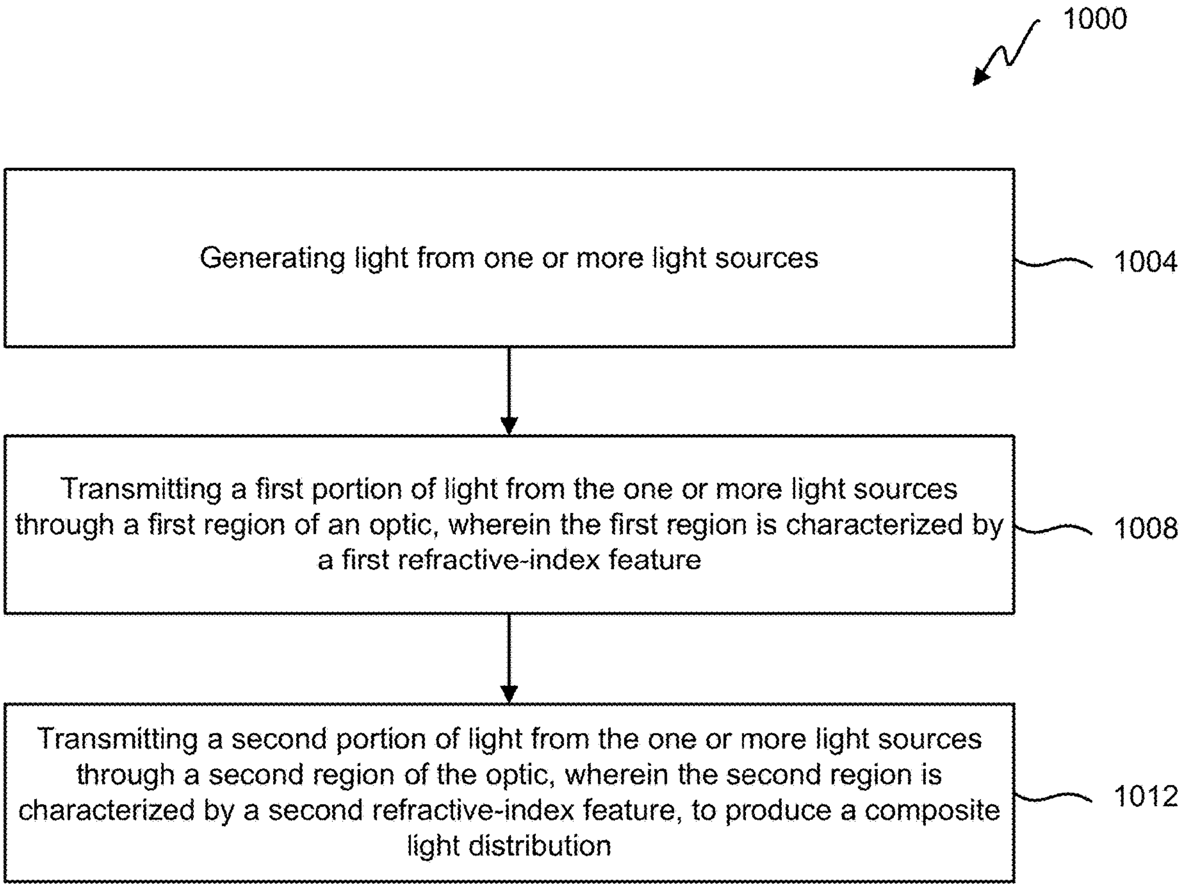
FIG. 10 illustrates a flowchart of an embodiment of a process of using a light fixture with a multi-region optic.

FIG. 10 illustrates a flowchart of an embodiment of a process 1000 of using a multi-region optic. Process 1000 begins in step 1004 with generating light from one or more light sources (e.g., using a multi-LED lamp). In step 1008, a first portion of light from the one or more light sources is transmitted through a first region of an optic, wherein the first region is characterized by a first refractive-index feature. For example, a first portion of light is transmitted through the first region 112 in FIG. 1 (e.g., and shown in FIGS. 2A and 2B). In step 1012, a second portion of light from the one or more light sources is transmitted through a second region of the optic (e.g., concurrently with transmitting the first portion of light through the first region), wherein the second region is characterized by a second refractive-index feature and/or a ridge structure in the second region, and the first refractive index feature, the second refractive index feature, and/or the ridge structure are operative to produce a composite light distribution from the one or more light sources. For example, a second portion of light is transmitted through the second region 116 in FIG. 1 and shown in FIGS. 3A and 3B. The first region the second region are operative to produce a composite light distribution (e.g., as shown in FIGS. 4A and 4B). The first refractive index feature is different from the second refractive index feature (e.g., rougher texture, thicker texture, a lens verses a texture, a different Fresnel focal length, etc.).

Various features described herein, e.g., methods, apparatus, computer-readable media and the like, can be realized using a combination of dedicated components, programmable processors, and/or other programmable devices. Some processes described herein can be implemented on the same processor or different processors. Where some components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Details are given in the above description to provide an understanding of the embodiments. However, it is understood that the embodiments may be practiced without some of the specific details. In some instances, well-known circuits, processes, algorithms, structures, and techniques are not shown in the figures.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for a light fixture comprising one or more light sources; and an optic, wherein:

the optic comprises:

a first region comprising a first feature, wherein the first feature is a first texture; and a second region comprising a second feature and a ridge structure in the second region, wherein:

the second feature is a second texture; and the first texture is rougher than the second texture; and the first feature, the second feature, and the ridge structure are arranged to produce a composite light distribution from the one or more light sources.

2. The system of claim 1, wherein:

the optic comprises a first side and a second side opposite the first side;

the first side faces the one or more light sources;

the first texture is on a surface of the second side of the optic;

the second texture is on the surface of the second side of the optic; and the ridge structure is on the first side of the optic.

3. The system of claim 1, wherein the second feature is formed by roughness on a surface of the optic.

4. The system of claim 1, wherein there is no ridge structure in the first region.

5. The system of claim 1, wherein:

the ridge structure is arranged to focus light, from the one or more light sources, within the second region; and the first feature is arranged to disperse light from the one or more light sources.

6. The system of claim 1, wherein:

the ridge structure is a first Fresnel structure; and the second region is arranged to be replaceable by a second Fresnel structure having a different focal length than the first Fresnel structure.

7. The system of claim 1, wherein:

the first region has an elliptical shape;

the second region has an elliptical shape;

the second region is inside the first region; and the first region is concentric with the second region.

8. The system of claim 1 further comprising a trim having a height equal to or less than 3 inches.

9. A method comprising:

generating light from one or more light sources;

transmitting a first portion of light from the one or more light sources through a first region of an optic, wherein the first region is characterized by a first feature; and transmitting a second portion of light from the one or more light sources through a second region of the optic, wherein:

the second region is characterized by a second feature and a ridge structure in the second region; and the first feature, the second feature, and the ridge structure are operative to produce a composite light distribution from the one or more light sources;

the first feature is a first texture;

the second feature is a second texture; and the first texture is rougher than the second texture.

10. The method of claim 9, wherein:

the optic comprises a first side and a second side opposite the first side;

the first side faces the one or more light sources;

the first texture is on surface of the second side of the optic;

the second texture is on the surface of the second side of the optic; and the ridge structure is on the first side of the optic.

11. The method of claim 9, wherein:

the first region has an elliptical shape;

the second region has an elliptical shape;

the second region is inside the first region; and the first region is concentric with the second region.

12. The method of claim 9, wherein the ridge structure is a Fresnel lens.

13. The method of claim 9, further comprising reflecting at least some of the first portion of light from a trim before transmitting through the first region.

14. The method of claim 9, wherein the second feature is a freeform lens.

15. The method of claim 9, wherein there is no ridge structure in the first region.

16. A system comprising:

one or more light sources; and an optic, wherein:

the optic comprises:

a first region comprising a first feature, wherein the first feature is a first texture; and a second region comprising:

a second texture, wherein the second texture is finer than the first texture; and a second feature arranged to focus light; and the first feature and the second feature are arranged to produce a composite light distribution from the one or more light sources.

17. The system of claim 16, further comprising a trim having a height equal to or less than 3 inches tall.

18. The system of claim 16, wherein the second feature is a Fresnel lens.

19. The system of claim 16, wherein the second feature is a lens.

20. The system of claim 16, wherein the second feature is a freeform lens.

* * * * *